United States Patent
Roscini

(10) Patent No.: US 7,029,116 B2
(45) Date of Patent: Apr. 18, 2006

(54) INNOVATIVE MINUS POWER LENS AND PROCESSING METHODS THEREOF

(76) Inventor: Giuseppe Roscini, Via Imbriani, 24, I-70054 Giovinazzo (Bari) (IT)

( * ) Notice: Subject to any disclaimer, the term of this patent is extended or adjusted under 35 U.S.C. 154(b) by 0 days.

(21) Appl. No.: 10/806,342

(22) Filed: Mar. 22, 2004

(65) Prior Publication Data

US 2005/0206840 A1    Sep. 22, 2005

(51) Int. Cl.
*G02C 7/02*    (2006.01)
*G02C 7/06*    (2006.01)

(52) U.S. Cl. .................. 351/159; 359/168; 359/174
(58) Field of Classification Search ............. 351/159, 351/177, 168, 174
See application file for complete search history.

(56) References Cited

U.S. PATENT DOCUMENTS 6,540,352 B1 *    4/2003    Billard et al. ............... 351/159

* cited by examiner

*Primary Examiner*—Scott J. Sugarman
(74) *Attorney, Agent, or Firm*—Herbert Dubno

(57) ABSTRACT

Innovative ophthalmic lens for nearsightedness, manufactured as a finished or semi-finished lens, lighter and thinner at the edges, with a wide visual field and cosmetically attractive, featuring a spherical centre and an aspherical periphery, both asymmetrical to the lens optical centre and varying in width.

Description of the manufacturing process of the above lens based on non industrial or CNC processing methods and moulding and injection moulding techniques.

11 Claims, 5 Drawing Sheets

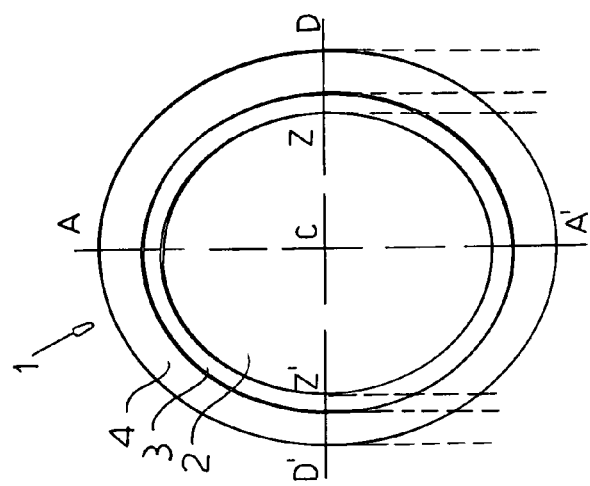
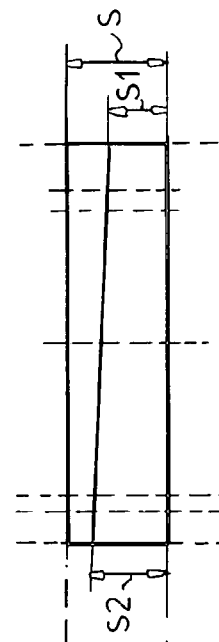
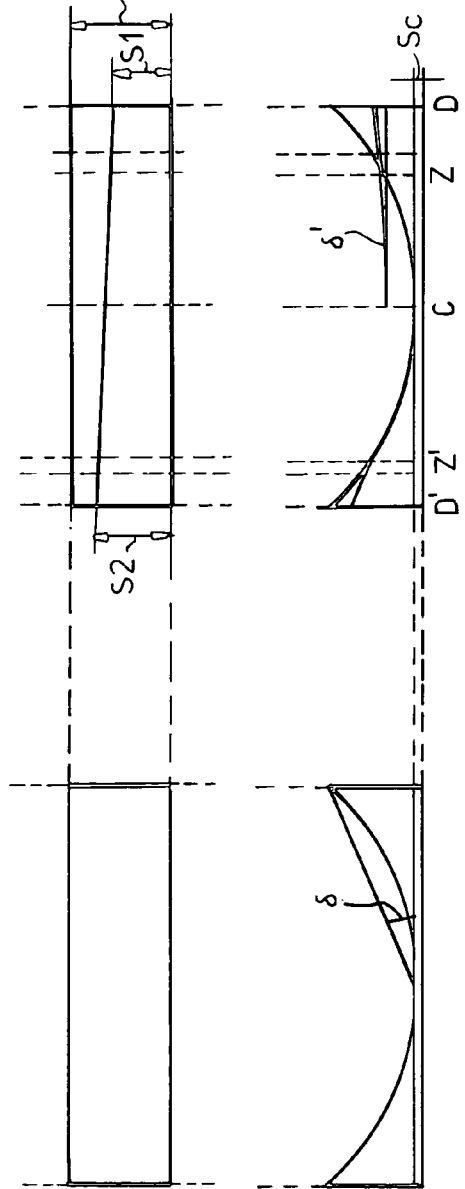
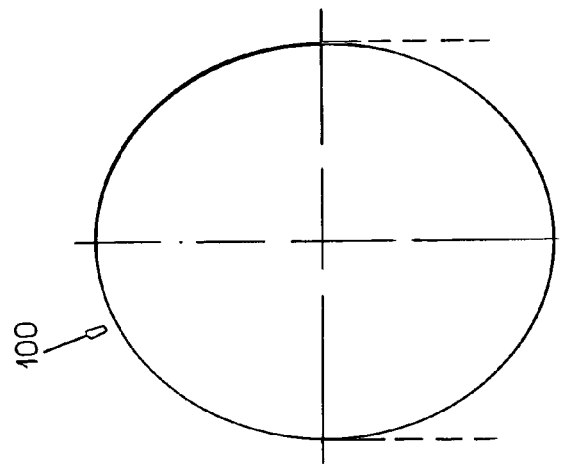
FIG.1a PRIOR ART
FIG.1b PRIOR ART
FIG.1c PRIOR ART

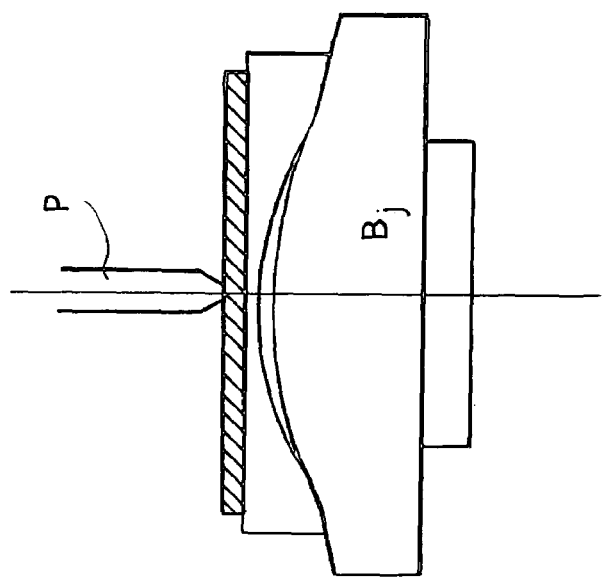
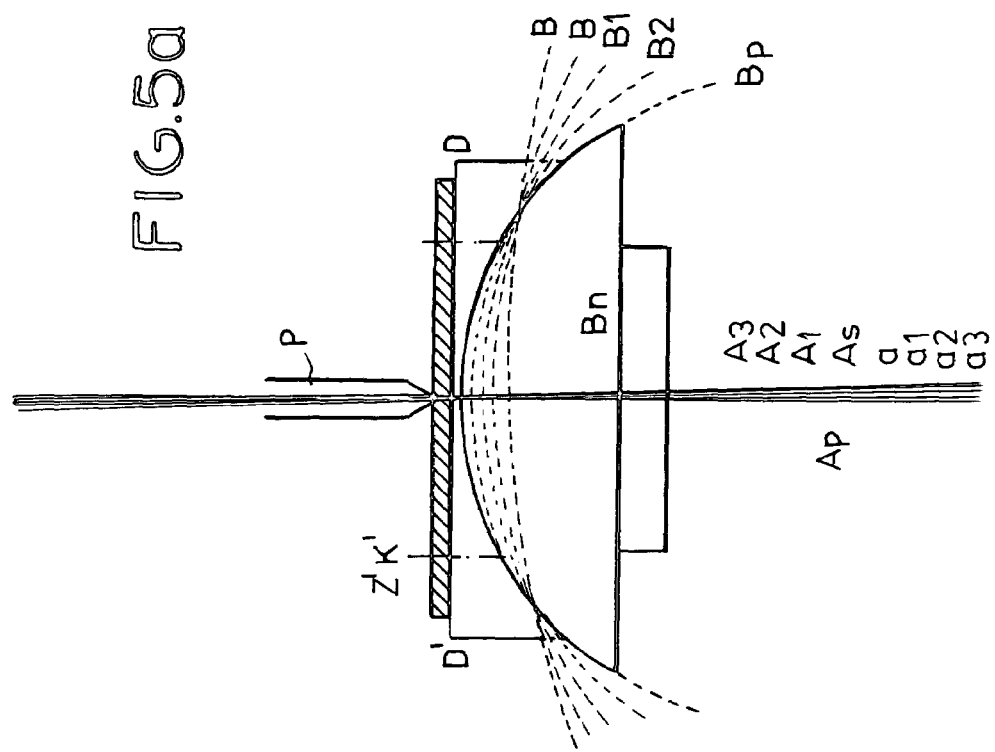

INNOVATIVE MINUS POWER LENS AND PROCESSING METHODS THEREOF

FIELD OF THE INVENTION

My present invention relates to a myopic correcting lens for medium-to-strong to particularly strong prescriptions.

In particular, the invention relates to a finished or semi-finished lens and the processing methods thereof. "Finished lens" means a lens with both surfaces finished, whereas "semi-finished" lens means a lens with one surface finished.

BACKGROUND OF THE INVENTION

New high index mineral or plastic materials are continuously being developed. Finished lenses, though premium cosmetics, are industrially produced to cater only to medium to low correction. People with high myopia require strong correcting lenses with a short radius of curvature and thick edges, which are difficult or impossible to fit in some eyeglass frames, thus restricting the selection of frames for nearsighted people. In addition, heavy eyeglasses are less comfortable and attractive. Appearance is further penalized by the "coke bottle" effect which is visible at the periphery of the eyeglasses. The effect is due to the reflections of the edging that the finished and fit lens causes to converge within, depending on the edge thickness.

In order to reduce the weight and thickness at the lens edges, the only method adopted has been that of reducing the size of the actual lens—that is the "lenticular" portion in which the prescribed power is provided. The remainder of the lens, the carrier, provides no refractive correction but gives dimension to the lens for mounting. These are the so called "lenticular lenses". The achieved reduction in weight and edge thickness is inversely proportional to the size of the lenticular portion of the lens. However, though lighter and thinner, lenticular lenses remain cosmetically unattractive because the central portion, which makes the eyes look fairly smaller, is clearly discernible within each ring of the eyeglasses, as is the portion joining it to the carrier. This cosmetic dilemma has not been solved even by the so called "joint lenticular lenses" which feature a neutral or convex carrier and a round-shaped junction between the lenticular portion and the carrier. As a result of the round-shaped junction, the wide surface of the carrier takes on a high plus power in sharp contrast to the high minus power of the center. Hence, a "tunnel effect" is produced which badly distorts the portion of the face which is covered with the lens. Lastly, the diameter of the actual optic area is insufficient to ensure viewing in all the natural directions of the gaze and forces the wearer to unnatural head postures in order to compensate for the limited freedom of movement of their eyes.

SUMMARY OF THE INVENTION

The lens design of the invention solves the aforementioned technical problems. It is a single-vision or multifocal eyeglass lens for medium-to-high to very high nearsightedness in plastic, mineral or other suitable material, lighter and thinner at the edges and ensuring a wide field of vision. It is cosmetically attractive, manufactured as a finished or semi-finished lens, and has a spherical center and an aspherical periphery, both asymmetrical to the lens optical center (coinciding with the geometrical center) and varying in width according to the power (central curvature of the lens) and the diameter (front width as viewed by an observer facing the eyeglass wearer) of the lens itself.

The invention also includes all the procedures involved in the manufacturing of the lens, based on both nonindustrial and CNC processing and molding and/or injection molding techniques.

These are some of the benefits which will become apparent in the detailed description of the lens design proposed.

BRIEF DESCRIPTION OF THE DRAWING

In the drawing:

FIG. 1 is a comparison of the prototype of a finished spherical lens design 1 (right) to a conventional piano-concave spherical lens (100) (left);

FIG. 4 and FIG. 5 are diagrams which illustrate the steps of the non industrial manufacturing process in the section of the lens along the reference diameter.

SPECIFIC DESCRIPTION

Figure 2A:
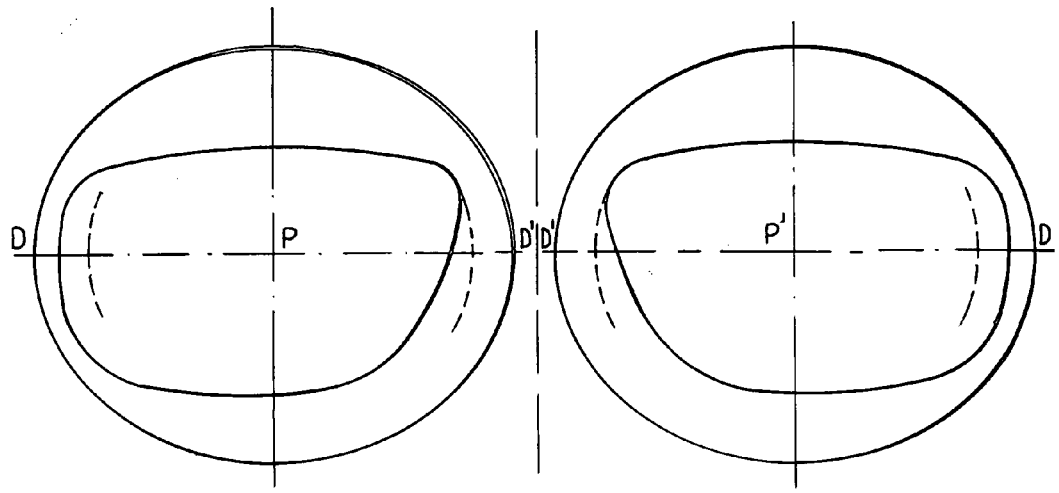
FIG. 2 is a diagram which illustrates the benefits of the asymmetrical lens surface during mounting.

The following are some of the symbols in use in the figures (some more symbols will be added throughout the description):

C: optical and geometrical center of the lens;

DD': reference diameter along the horizontal axis of symmetry viewer from the front;

AA': axis of the lens perpendicular to the reference diameter which passes through the center (C). The lens is asymmetrical to the axis AA' which, in turn, is vertical to a front viewer;

S: initial thickness of the lens. It is that of an ordinary 100 planoconcave lens (with a constant curvature), having the same DD', the same power $\phi$ (central curvature) and the same index of refraction (IOR) n.

Sc: center thickness of the finished lens.

FIG. 1 compares three projections of the lens design to the projections of an ordinary piano-concave lens 100 with a constant curvature.

On the right side of FIG. 1, the minus lens is subdivided into two areas. A centrally spherical area 2 is encompassed within the ZZ' diameter, which defines the refractive correction of the lens, and equals 70% of DD' in width. This area is wider in large diameter and medium-to-low myopic power lenses and smaller in small diameter and medium-to-high to very high myopic power lenses (small radiuses of curvature). Tangential to it is an aspheric area, which consists of a paracentral area 3 encompassing the spherical area 2, with a diameter equal to 10% of DD'. A peripheral area 4 encloses the paracentral area; it is tangential to the paracentral area and stretches down to the lens edge. This is the flattest area which allows for the reduced lens mass and thickness.

The three areas are adequately connected in space, the intersection between a plane perpendicular to that drawn by diameters DD' and AA' and the back surface of the lens being a polynomial curve which interpolates a set of accurately calculated points.

The end surface profile of the lens 1 results from the summation of a series of portions of spherical surfaces FIG. 5. First, the diameter and the refractive correction of the lens are set: $\phi=(n-1)/R$, where n is the refractive index of the material of which the lens is made and R is the radius of curvature.

The first surface FIG. 4, the one which corresponds to the central curvature, for providing the prescribed refractive correction, results from the intersection between the initial flat semi-finished material and a sphere with a radius R, the center of which lies on the straight line passing through C and is perpendicular to the base of the semi-finished lens. The obtained profile is identical to that of a lens (100) with a constant curvature, an edge thickness S and a central thickness Sc.

Figure 4C:
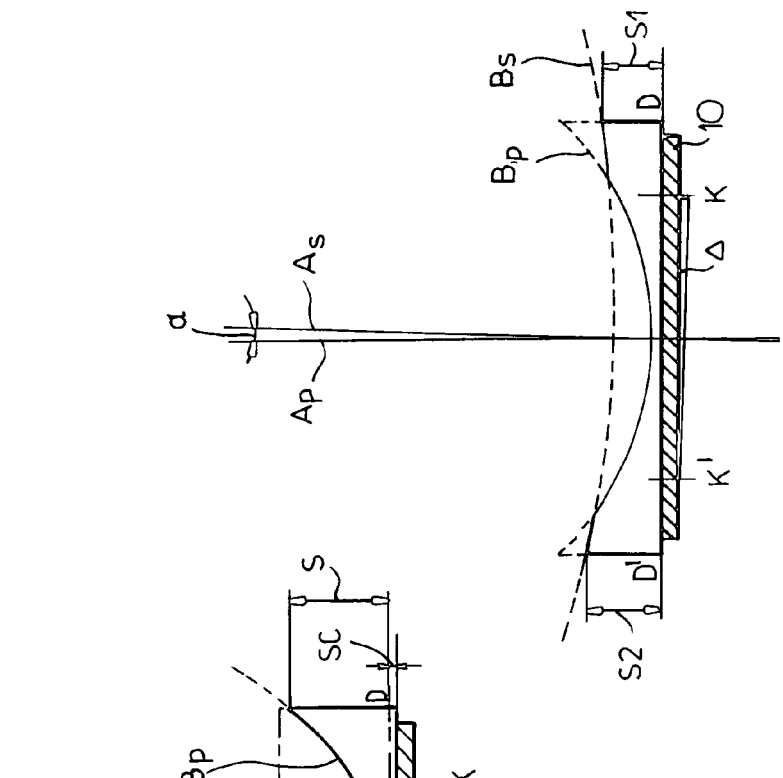

In FIG. 4C the aspheric area of the lens is designed so that its axis is inclined with respect to the axis of the central area of an appropriate angle $\alpha$. In FIG. 5A by inclining the base of the semi-finished lens to make the final surface of the lens asymmetrical, the second and the following cuts are made through a generally spherical surface Bn, the center of which (Cn) lies along the half-line originating at C and having an inclination angle $\alpha_n$, the radius Rn of which is correlated to the power of the peripheral area ($\phi$n), which is considered as constant. The center Cn is extrapolated from the thickness SI at the lens edge, corresponding to the extreme D of the reference diameter. S1 is a predetermined fraction of S. It follows that the thickness S2 corresponds to D'. For instance, if S1 equals 60% of S, S2 will be about 75% of S (FIG. 1b).

The process continues in a similar fashion, so that that the spheres with radiuses varying between R and Rn (R1, R2, . . . , Rn-1) or with decreasing powers from $\phi$ to $\phi$n ($\phi$1, $\phi$2, . . . , $\phi$n-1) cut the cusps between the various portions of the spheres that are formed at each repetition and, at the end of the process, the resulting surface is satisfactorily joint in space. The value of n can be regarded as a design constant or a parameter to be increased, should the number of repetitions be insufficient to yield the required accuracy, or decreased, should the obtained accuracy exceed that of the tool used to cut the lens, be it a non-industrial or an industrial tool (CNC cutting machine).

The concurrent action of the inclination of the axis of the aspheric periphery of the lens with respect to the axis of the centrally spherical area and the radial reduction in power towards the external edge of the lens contribute to making the lens surface asymmetrical with respect to AA' and causing a simultaneous, variable reduction in the thickness of the peripheral area. A further consequence of the inclination of the axis of the peripheral area is its varying width along DD'. It is maximum close to the minimum peripheral thickness S1 and minimum at the maximum peripheral thickness S2.

The eccentricity of the peripheral area produces a gradual decrease in the central power of the lens with a subsequent reduction in the thickness at the edges. The advantage is that the points which are immediately adjacent to the central area (paracentral area) have a refractive correction close to that of the central area. The thickness at the edges, SI and S2 (FIG. 1b), is less than that of a 100 plano-concave lens having the same diameter, central thickness, refractive index and power. Hence, both the spherical and the aspheric areas are asymmetrical with respect to the center C. The centrally spherical area ZZ' (FIG. 1 a), the only one which retains the profile of the 100 piano-concave lens, stretches more to the left (CZ' portion) than to the right (CZ portion). The aspheric periphery is narrower to the left (D'Z' portion) than to the right (DZ portion). The surface curve variation which remains negative at all points is more marked along the DZ portion than along the D'Z' portion. The same power drop is reported along two segments (DZ and D'z') and at two different heights, thus originating absolutely different profiles.

In section 1c, the end profile of the lens has been drawn, showing the amount of removed stock and the mitigated "COKE® bottle" effect when compared to the constant curvature lens (100). The angle $\delta$ of the lens periphery (1) is smaller than the angle $\delta$ of any ordinary lens (100)—in which the prismatic effect causes the reflections of edging to converge towards the back side of the lens—and the reflections of the edging of the innovative lens are caused to converge outside the lens. In a front view, the lens (1) is thus free of the "COKE® bottle" effect which is typical of any minus power lens.

Figure 2B:
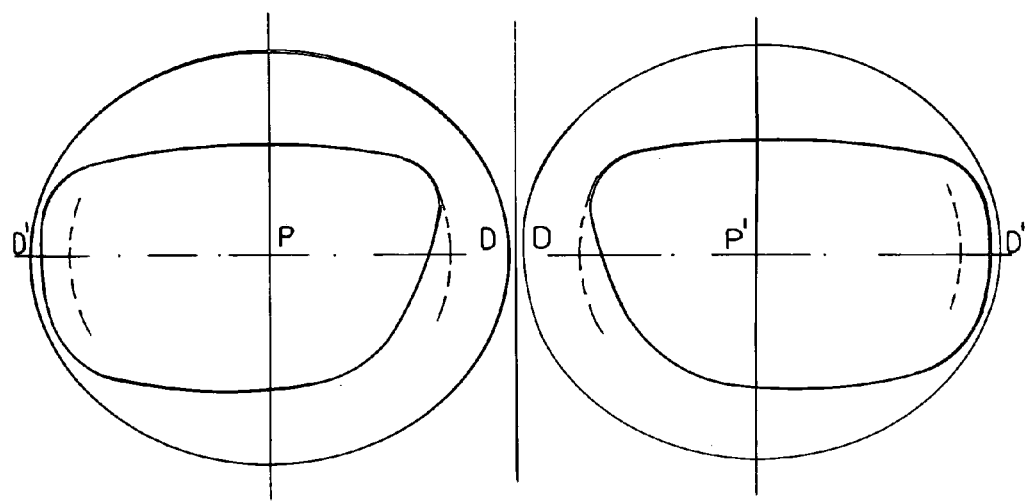

FIG. 2 documents the benefits of the asymmetrical surface of this lens design which complies, during mounting, with the interpupillary distance of wearers with a wide (FIG. 2a) or short distance (FIG. 2b). Being PP' the interpupillary distance, in the case of a wide interpupillary distance (FIG. 2a), it is advisable to cut the lens in such a way that, when the optical/geometric center overlaps the pupillary center P or P', the wider aspheric periphery coincides with the temple of the wearer and the narrower section with the nasal portion. By contrast, in the case of a short interpupillary distance (FIG. 2b), it is advisable to cut the lens so that the narrower section of the aspheric periphery coincides with the temple of the wearer and the wider section with the nasal portion. In both cases, the beneficial role of the asymmetrical surface of the lens is apparent. Regardless of the interpupillary distance of the wearer, the accurate centering of the eyeglasses is guaranteed. The central area (with a constant power) and the paracentral area (with a power close to the central one) cover most of the width of the outline of the eyeglasses and the wearer benefits from vision acuity in all the directions of the gaze, without having to resort to unnatural head movements, whereas the periphery, with a more marked power drop, lies at the extreme temple periphery of the eyeglasses, thereby diminishing the thickness and weight of the lens as well as the spherical aberration, which is typical of lenses with a small radius of curvature and high edge thickness, and nullifying the reflections of the lens edging.

As far as cosmetics and function are concerned, the aspheric surface noticeably improves the lens. The power drop, beside reducing the spherical aberration, also lessens the shrinking effect which is produced by the periphery, thus preventing any distortion of the face of the wearer covered with eyeglasses, as viewed from the outside.

FIG. 2 a and FIG. 2b are but general sketches. According to the prescribed power, the actual interpupillary distance, the selected frame and the desired cosmetic effect, the best diameter, the best aspheric shape of the lens and the portion of the periphery with a different power drop to be located at the temple can be selected.

The lens can be manufactured as a "semi-finished" or "finished" lens. The "semi-finished" lens is obtained from a blank (unfinished on both sides) which is finished on the back surface alone with a precise dioptric power. From this semi-finished lens a wide range of prescribed dioptric powers can be derived by finishing the front side in a spherical or toric fashion. The finished lens is obtained from a semi-finished lens, with the front side already conventionally finished with a given dioptric power. The back side is finished to give the lens the prescribed power. By adjusting some or all the design parameters (diameter, power, thickness at the edges along the DZ portion, width of the central area, central thickness of the finished lens, constant or repeatedly variable inclination of the half-lines on which the centers of the spheres which form the periphery lie) a vast array of profiles can be obtained.

Figure 3A:
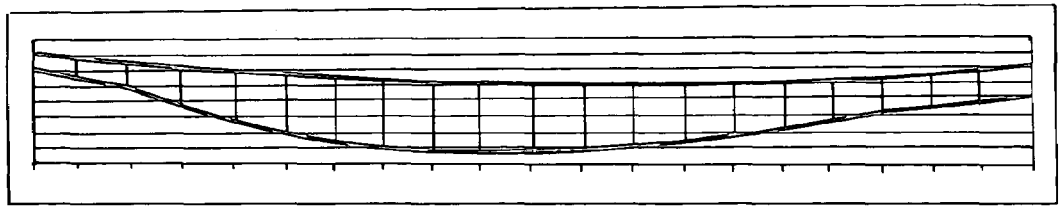
FIG. 3 is a diagram which reports some spatial projections of a surface calculation case.
Figure 3B:
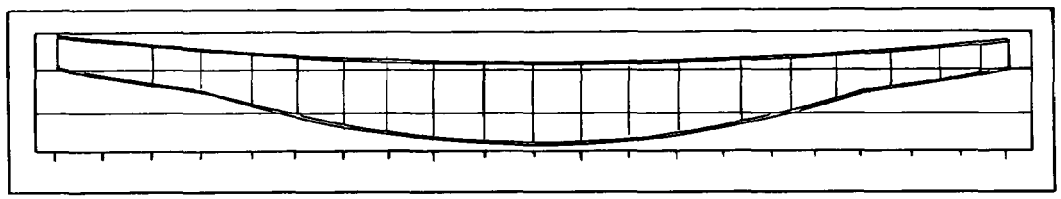
Figure 3C:
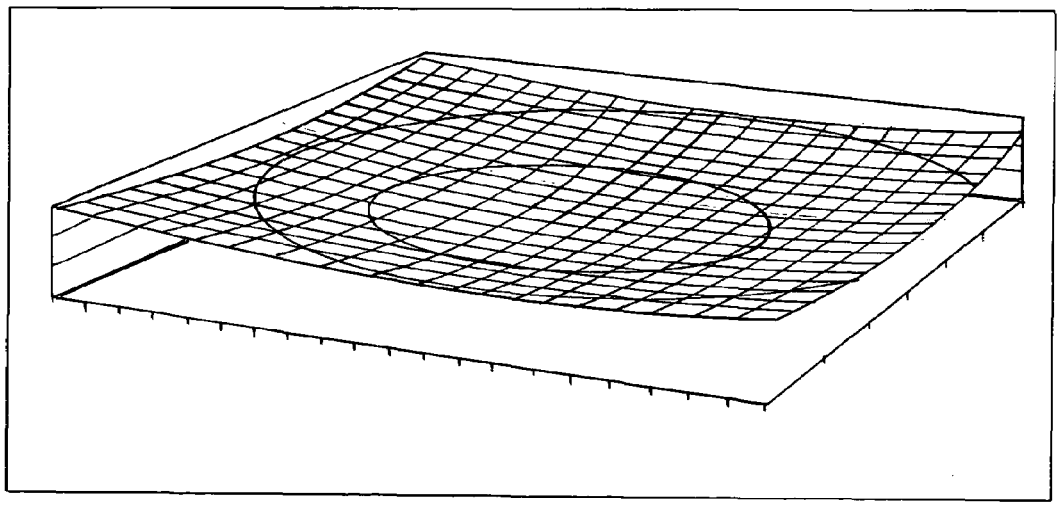

Among the processing methods in use for this innovative lens design, noteworthy is the CNC machining which, thanks to the recent strides made in technological and industrial research, yields accurate free-form surfaces, while ensuring better optic quality and lower product costs. FIG. 3 reports some spatial projections of a numerically calculated surface. FIG. 3a shows a projection of the back surface of the lens onto the plane π passing through the reference diameter (DD') and perpendicular to the axis (AA'), highlighting the difference in edge thickness (S1 and S2) and profile and the general asymmetry between the right side and the left side with respect to the axis AA', perpendicular to the plane of the drawing. FIG. 3b shows a projection of the back surface of the lens onto the plane π passing through the axis AA' and perpendicular to the diameter DD'. FIG. 3c shows a projection of the back surface of the lens onto the plane π with a 25° rotation with respect to π and a 10° inclination towards the viewer, so as to display the surface as a whole.

"Finished" lenses for the most common power intervals and "semi-finished" lenses (from which all prescribed powers can be derived) can be industrially produced for molding or, in the case of thermoset plastic materials, for injection molding in ready-made molds. Should the lens be industrially manufactured, reduced production costs would go hand in hand with accrued eyeglass customization.

This innovative lens design can also be manually produced. Manufacturing would be more time-consuming, but undoubtedly cost-effective, given the limited piece of equipment required. A detailed description of the manufacturing process follows in FIGS. 3 and 4 which show the section of the lens along DD'. This is but an example and it is in no way restrictive.

Figure 4B:
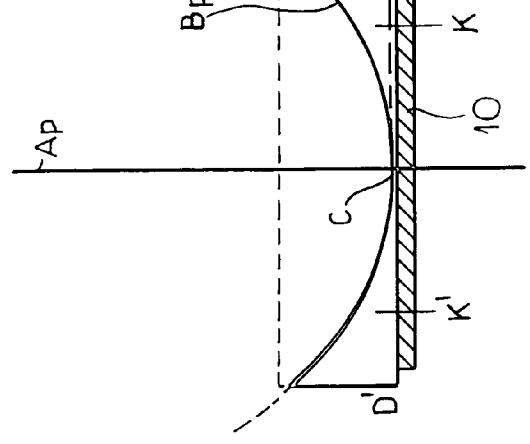
Figure 4A:
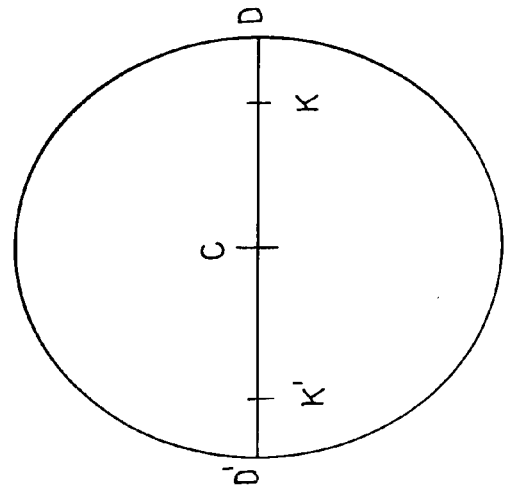

Should anyone wish to manufacture a prototype of a minus power lens with a DD'=70 mm, a flat front surface, central thickness SC=1 mm and power expressed in dioptres $\phi=(n-1)/R$ depending on the index of the selected material, the following values would apply: R=50 mm, n=1.500, hence, $\phi=-10D$. The semi-finished lens would have a front flat surface on which the reference diameter DD', the geometrical center C and a central portion KK', having a width equal to a predetermined fraction of DD', would be temporarily marked. KK' should preferably =65% DD' (FIG. 4a).

The marking of KK' helps manufacture the aspheric periphery of the lens. FIG. 4b illustrates the first step, the so called "rough grinding" of the lens. Using a conventional surface generator, after clamping the semi-finished lens to the stand (10) which, in turn, is firmly locked to the generator, stock is removed from the back side of the semi-finished lens, thus generating a spherical surface or principal base Bp, which is expressed in dioptres and coincides with the power of the lens under grinding, e.g. Bp=−10. The 10 depth of stock removal is selected so as to obtain the desired center thickness Sc, e.g. Sc 1 mm. Stock removal based on Bp will also define the edge thickness S, which in this case would be 15 mm.

Then, (FIG. 4c) a surface having a Bs base or secondary base is generated as a predetermined fraction of Bp, preferably Bs≈25% Bp, hence Bs=−2.50. During this second phase of grinding, the axis Ap of the principal base Bp is maintained inclined with respect to the axis As of the secondary base Bs at a corresponding angle α. As shown in FIG. 4c, in order to obtain the reciprocal inclination between Ap and As, a "prismatic ring" or wedge Δ is inserted between the lens and the generator chuck and oriented along the reference diameter DD', with its base towards D. The wedge gives asymmetry to the final surface of the lens. The Δ value (expressed in prismatic dioptres) of the wedge is a fraction of the thickness S as defined above—preferably Δ≈10% S, in the case in point, Δ=1.5. The depth of stock removal to generate Bs should be selected so that, at D, the lens thickness becomes S1≈60% S, that is s1=9 mm. As a result, at D', the side opposite to S1, the lens thickness S2 is automatically defined. In the example, S2=11.25 mm, that is S2≈75% S. In addition, FIG. 4c shows that, owing to the prismatic ring, when defining the variable thickness along the lens edge, the base Bs varies in width. In the section of the main diameter DD' it reaches its peak width on the side of the minimum thickness S1 and drops to its minimum width on the side of the maximum thickness S2. Hence, the central portion of Bp is asymmetrical to the geometrical centre of the lens.

The next step of the process is called "lapping" (FIG. 5) and it draws the ultimate contour of the lens back side. A conventional lapping machine can be used to this end. After lapping both surfaces (Bp and BS) with the appropriate spherical tools, having the same bases (Bp and Bs), lapping proceeds so that the tools with bases Bn, ranging between Bp and Bs, cut the cusps in between the various portions of the spherical surfaces which are generated at every stroke. A gradual transition from the lens edge to K is thus obtained, temporarily marked at the centre, with a satisfactory spatial connection. The calculations for selecting Bn tools and the amount of stock to be removed are referred to the area of the lens with thickness S1. It follows that typical values of the area corresponding to the thickness S2 are 20 inferred. The sequential Bn value to be assigned to the base of the tool at every stroke is extrapolated from the arithmetical mean between the base of the reference portion of the surface and that of the externally adjacent portion. In the example, B1=(Bp+Bs)/2=6.25; B2 (Bp+B1)/2=8.12; B3=(B1+Bs)/2=4.37. The depth of stock removal of each base is such that each stroke removes approximately half of the innermost reference surface.

As shown in FIG. 5a, in the lapping system, a rod P, through a ball-and-socket joint, ensures uniform distribution of pressure and freedom of rotation and transmits an oscillation to the lens which is kept flush with the tool (Bn). Hence, every time a spherical tool with a new base is used, the lens self-centers onto the temporary chamfer resulting from the intersection of the previously used bases and takes on a varying inclination an<a. As a consequence, every newly generated surface portion is not concentric, but variously connected at every point, thus originating an overall aspheric surface, which is asymmetrical to the optical/geometrical center of the lens.

It is worth underscoring that only some surfaces with major curvature differences have been highlighted in FIG. 5a. The number of required tools will vary with the desired accuracy, function and cosmetics of the lens. In order to eliminate any residual discontinuity at the periphery of the lens, an optional tool Bj can be used in a resistant but soft material (FIG. 5b), with a mean curvature with respect to the previously used tools. Given the type of material in use, the tool will take on the same outline of the periphery of the lens, as expected.

The last step of the process, "polishing", performed with very fine abrasives and following the same procedure adopted for lapping, completes the lens processing.

The invention claimed is:

1. A single-vision or multifocal eyeglass lens for medium-high to very high nearsightedness comprising a lens body of a transparent material, said lens body having an optical center having a central asymmetric optical spherical correction area with a constant power thereof surrounding said optical center and a peripheral asymmetric aspheric optical correction area with varying decreasing power surrounding said central area, said lens body having both optical correction areas asymmetric to the optical center that coincides with a geometrical center of the lens body and varying in width according to the power and the diameter of the lens.

2. The eyeglass lens defined in claim 1 wherein said internal-concave surface has a central spherical optical correction area with constant power that defines the exact power of the lens.

3. The eyeglass lens defined in claim 1 wherein said peripheral aspherical optical correction area with decreasing power surrounding said spherical area consist of a paracentral area directly adjacent said asymmetric spherical optical correction area, tangential to said asymmetric spherical correction area, and an extreme peripheral area adjacent said paracentral area and tangential to said paracentral area, said peripheral area defining the minimum and maximum edge thickness of the lens.

4. The eyeglass lens defined in claim 3 having the edge thickness varying continuously all around its section.

5. The eyeglass lens defined in claim 3 wherein said peripheral aspherical optical correction area lies at an angle to a plane perpendicular to said optical axis that coincides to the geometrical axis of said lens body.

6. The eyeglass lens as defined in claim 5 wherein said surface asymmetric to the optical center whatever the interpupillary distance is, with the same diameter, guarantee the accurate centering of the eyeglass keeping the central correction area covering almost the entire shape of the frame, the peripheral correction area covering always just the extreme temple area of the frame.

7. The eyeglass lens as defined in claim 4 manufactured as a finish or semi-finished lens.

8. The eyeglass lens defined in claim 1 wherein said asymmetric spherical optical correction area has a width of 70% of said reference diameter.

9. The eyeglass lens defined in claim 1 wherein said aspherical optical correction area surrounding said spherical area consists of a paracentral area directly adjacent said asymmetric spherical optical correction area, tangential to said asymmetric spherical optical correction area, and a width along said horizontal axis which is 10% of said reference diameter, and a peripheral area adjacent said paracentral area and tangential to said paracentral area, said peripheral area running to a peripheral edge of said lens body.

10. The eyeglass lens defined in claim 1 wherein said aspherical optical correction area surrounding said spherical area is defined by a series of spherical surface portions.

11. The eyeglass lens defined in claim 10 wherein said angle $\delta'$ is such that edge reflections converge externally of the lens body to prevent a "COKE®" bottle" effect.

* * * * *